United States Patent
Reyes et al.

(10) Patent No.: US 9,670,386 B2
(45) Date of Patent: Jun. 6, 2017

(54) BIOMIMETIC ADHESIVE COMPOSITIONS COMPRISING A PHENOLIC POLYMER AND METHODS FOR USE THEREOF

(71) Applicant: Halliburton Energy Services, Inc., Houston, TX (US)

(72) Inventors: Enrique A. Reyes, Tomball, TX (US); Pinmanee Boontheung, Duncan, OK (US); Narongsak Tonmukayakul, Duncan, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/520,379

(22) Filed: Oct. 22, 2014

(65) Prior Publication Data
US 2015/0038645 A1   Feb. 5, 2015

Related U.S. Application Data

(62) Division of application No. 13/478,910, filed on May 23, 2012, now Pat. No. 8,893,790.

(51) Int. Cl.
| | |
|---|---|
| *C09J 101/08* | (2006.01) |
| *C09K 8/575* | (2006.01) |
| *C09J 171/00* | (2006.01) |
| *C09J 189/00* | (2006.01) |
| *C09K 8/514* | (2006.01) |
| *C09J 105/08* | (2006.01) |
| *C09K 8/00* | (2006.01) |
| *C09J 201/06* | (2006.01) |

(52) U.S. Cl.
CPC ........... *C09J 101/08* (2013.01); *C09J 105/08* (2013.01); *C09J 171/00* (2013.01); *C09J 189/00* (2013.01); *C09J 201/06* (2013.01); *C09K 8/00* (2013.01); *C09K 8/514* (2013.01); *C09K 8/5758* (2013.01)

(58) Field of Classification Search
CPC ...... C09J 101/08; C09J 105/08; C09J 171/00; C09J 189/00; C09J 201/00; C09K 8/00; C09K 8/514; C09K 8/5758
See application file for complete search history.

(56) References Cited

U.S. PATENT DOCUMENTS

| | | | |
|---|---|---|---|
| 5,015,677 A * | 5/1991 | Benedict et al. | 524/17 |
| 5,242,808 A * | 9/1993 | Maugh et al. | 435/69.1 |
| 8,893,790 B2 | 11/2014 | Reyes et al. | |
| 2008/0247984 A1* | 10/2008 | Messersmith | C08G 65/3317 424/78.02 |
| 2009/0036611 A1* | 2/2009 | Wilker | C08F 212/08 525/328.5 |
| 2012/0156164 A1* | 6/2012 | Park | A61L 24/0015 424/78.3 |

FOREIGN PATENT DOCUMENTS

WO   WO 2011/028031   *   3/2011

OTHER PUBLICATIONS

Monahan, J., et al.; Langmuir, 2004, vol. 20, p. 3724-3729.*

* cited by examiner

*Primary Examiner* — Robert Jones, Jr.
(74) *Attorney, Agent, or Firm* — McDermott Will & Emery LLP

(57) ABSTRACT

Biomimetic adhesive compositions can be used in various aspects of subterranean treatment operations. Methods for treating a subterranean formation can comprise: providing an adhesive composition that comprises a first polymer comprising a plurality of monomers that comprise a phenolic moiety, a biopolymer that is crosslinkable with the first polymer, a crosslinking agent, and an oxidizing agent; introducing the adhesive composition into a subterranean formation; and forming a coacervate-bound surface in the subterranean formation by crosslinking the first polymer.

13 Claims, No Drawings

BIOMIMETIC ADHESIVE COMPOSITIONS COMPRISING A PHENOLIC POLYMER AND METHODS FOR USE THEREOF

CROSS-REFERENCE TO RELATED APPLICATIONS

The present application is a divisional of U.S. patent application Ser. No. 13/478,910, filed on May 23, 2012.

BACKGROUND

The present disclosure relates to adhesive compositions, and, more specifically, to biomimetic adhesive compositions and their use in a subterranean formation.

Biological organisms are well known for their ability to construct a wide breadth of biomaterials, many of which have properties that are unrivaled by their synthetic counterparts. As used herein, the term "biomaterial" refers to a substance that is synthesized by a biological organism. Biomaterials can be used for a wide variety of purposes by biological organisms including, for example, support and protection (e.g., endoskeletons, exoskeletons, shells, and like biomineralized structures), trapping of prey (e.g., spider webs), locomotion, and surface adhesion. Self-assembly may play a role in the formation of many of these biomaterials. As used herein, the term "self-assembly" refers to the spontaneous organization of substances to form stable, well-organized, structurally defined arrays without the influence of external forces.

Study of the structure of biomaterials can provide the inspiration for designed synthetic materials. In some cases, a synthetic material can attempt to replicate the structure of a biomaterial. In other cases, a synthetic material can have a significantly different structure than the parent biomaterial, but still incorporate a structural element therefrom, sometimes in modified form. Structurally modified synthetic materials that retain a structural element or modified structural element of a parent biomaterial are often referred to as "biomimetic materials." Modification of the parent biomaterial structure, as in biomimetic materials, may be beneficial when the parent biomaterial is unsuitable for an intended application due to undesirable properties such as, for example, cost, stability, mechanical properties, physical properties, chemical properties, and the like.

Adhesive compositions, in particular, are ubiquitous among biological organisms due to their ability to effectively function in a variety of environments. Marine mussels and other marine organisms, in particular, are known for their ability to secrete adhesive proteins (bioadhesives) that can form a coacervate in the mussels' aqueous habitat. As used herein, the term "coacervate" refers to an agglomeration of crosslinked molecules that adjoins two or more surfaces. Most typically, these adhesive proteins comprise a DOPA (3,4-dihydroxyphenylalanine) or like catechol-type moiety within the polymer structure. Without being bound by any theory or mechanism, it is believed that catechol-type moieties are susceptible to oxidation, particularly in the presence of transition metal ions, thereby forming an o-quinone, which ultimately undergoes a crosslinking reaction with another catechol-type moiety. The presumed crosslinking reaction is shown in Scheme 1 below.

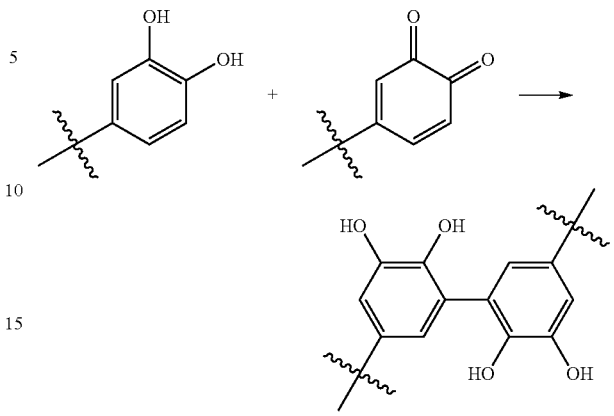

Scheme 1

Although these types of adhesive proteins and others can be easily synthesized by biological organisms, such proteins represent a much greater challenge for commercial production and field applications in terms of synthetic difficulty and cost. Furthermore, protein-derived biomaterials may provide poor stability at elevated temperatures and/or in certain types of chemical environments.

Given the beneficial properties of bioadhesives, it would be desirable to apply similar adhesives in a non-biological setting, particularly in environments where traditional adhesives may be less adherent or have insufficient strength, such as in aqueous environments. As noted above, in non-biological settings, protein molecules can present considerable synthetic and economic challenges that may prohibit their successful implementation. DOPA-containing proteins may be particularly challenging in this regard. Not only is DOPA very expensive, but chemical instability of its catechol moiety can make synthetic manipulations difficult.

Subterranean treatment operations are one field application where it can sometimes be desirable to utilize adhesive compositions. Adhesive compositions can be used in subterranean formations, for example, to consolidate a loosely consolidated formation, to improve structural integrity of the wellbore, to consolidate a particulate pack (e.g., a proppant pack or a gravel pack) in the subterranean formation, to control the production of fines, and the like. Aqueous tackifying agents, non-aqueous tackifying agents, curable resin tackifying agents, and non-curable and non-aqueous tackifying agents can be used in this regard in subterranean treatment operations. Although these tackifying agents and others can often be successfully used in subterranean treatment operations, there may still be certain applications in which they are chemically unstable or are otherwise difficult to deploy operationally. Furthermore, some components of traditional adhesive compositions can present challenges from the standpoint of biodegradability or environmentally acceptability.

SUMMARY OF THE INVENTION

The present disclosure relates to adhesive compositions, and, more specifically, to biomimetic adhesive compositions and their use in a subterranean formation.

In some embodiments, the present invention provides a method comprising: providing an adhesive composition comprising: a first polymer comprising a plurality of monomers that comprise a phenolic moiety; a biopolymer that is crosslinkable with the first polymer; a crosslinking agent; and an oxidizing agent; introducing the adhesive composition into a subterranean formation; and forming a coacervate-bound surface in the subterranean formation by crosslinking the first polymer.

In some embodiments, the present invention provides a method comprising: providing an adhesive composition comprising: a first polymer comprising a plurality of monomers that comprise a 1,2-dihydroxybenzene moiety; a second polymer that is crosslinkable with the first polymer; an optional crosslinking agent; and an oxidizing agent; introducing the adhesive composition into a subterranean formation; oxidizing at least a portion of the 1,2-dihydroxybenzene moieties so as to crosslink the first polymer; and forming a coacervate-bound surface in the subterranean formation from the adhesive composition.

In some embodiments, the present invention provides an adhesive composition comprising: a first polymer comprising a plurality of monomers that comprise a 1,2-dihydroxybenzene moiety; a second polymer that is crosslinkable with the first polymer; an optional crosslinking agent; and an oxidizing agent.

The features and advantages of the present invention will be readily apparent to one having ordinary skill in the art upon a reading of the description of the preferred embodiments that follows.

DETAILED DESCRIPTION

The present disclosure relates to adhesive compositions, and, more specifically, to biomimetic adhesive compositions and their use in a subterranean formation.

In the context of the present disclosure, we have discovered adhesive compositions that are biomimetic in nature and have been inspired by the bioadhesives produced by marine mussels. Marine mussel bioadhesives are polyphenolic proteins that are believed to be non-toxic and environmentally benign. Although the adhesion of marine mussels and other marine organisms to surfaces can be a nuisance in some cases (e.g., barnacle adhesion to ships), the strength and utility of the bioadhesive itself is not in doubt. Given the beneficial properties of bioadhesives, it would be desirable to apply like adhesive compositions in a non-biological setting, particularly in environments where traditional adhesives may be less adherent or have insufficient strength, such as in aqueous environments, including those encountered during subterranean treatment operations.

In view of the previously described difficulties associated with proteins, particularly DOPA-containing proteins, we have designed adhesive compositions that are biomimetic in nature and incorporate the more desirable functional aspects of marine mussel bioadhesives while addressing potential cost, stability, and synthetic concerns. The adhesive compositions described herein may be particularly desirable for use in aqueous environments, including those commonly encountered during subterranean treatment operations.

The adhesive compositions described herein may be advantageous over those presently in use for subterranean treatment operations due to their biological inspiration. Because the adhesive compositions are biologically inspired, they may have a smaller environmental footprint than do other synthetic adhesive compositions that are currently used in subterranean treatment operations. Likewise, the adhesive compositions may be particularly well suited for use in an aqueous environment.

Even if the parent bioadhesives could be successfully utilized in a non-biological setting, it is believed that the adhesive compositions described herein may present certain additional advantages over the parent bioadhesive itself, particularly when used in a non-biological setting. First, the adhesive compositions described herein can comprise an adhesive substance that is structurally related to but modified from the adhesive protein of the parent bioadhesive. The adhesive substance may retain the adhesion properties of the parent bioadhesive while improving its stability and lowering its synthesis costs. These modifications are described in more detail hereinafter. Second, the adhesive compositions described herein can comprise a diluent polymer that does not contain catechol-type moieties and is crosslinkable with the adhesive substance. Inclusion of the diluent polymer may further lower costs of the adhesive compositions by allowing smaller quantities of the adhesive substance to be used while still achieving good adhesion. Inclusion of the diluent polymer may provide the bulk needed for the adhesive compositions to form a coacervate-bound surface, and/or the diluent polymer may guide the self-assembly formation of the coacervate-bound surface in some cases. In this regard, the diluent polymer itself may have good mechanical strength but not be capable of strongly binding to a surface alone. However, the adhesive substance and the diluent polymer may work in concert in the present adhesive compositions, with the adhesive substance providing surface adherence and the diluent polymer providing bulk and enhancing mechanical strength, particularly when the adhesive substance and the diluent polymer are crosslinked with one another. In addition, the diluent polymer may be chosen to further tune the properties of the adhesive compositions. For example, the diluent polymer may be chosen to have a specified mechanical strength or to be degradable, such that the adhesive composition eventually degrades. In some embodiments, the diluent polymer may comprise a biopolymer, which can further support the environmental favorability of the adhesive compositions described herein.

As noted above, the adhesive compositions described herein can comprise an adhesive substance that is structurally related to but modified from the adhesive protein of the parent bioadhesive. These modifications may improve stability, lessen synthetic difficulties, and reduce costs associated with the adhesive compositions described herein. In some embodiments of the present invention, we have replaced the peptidic backbone of the adhesive protein, at least in part, with a non-peptidic polymer backbone. This replacement can improve stability and lessen the challenges associated with polypeptide synthesis, particularly large-scale polypeptide synthesis. Furthermore, in some or other embodiments of the present invention, we have replaced DOPA with other catechol-type moieties, which may further improve stability and lower costs. In addition, the amount of catechol-type moieties included in the adhesive substance may be adjusted to promote a desired degree of adhesion. By keeping the amount of catechol-type moieties to the minimum amount necessary to achieve a desired degree of adhesion, chemical stability may be improved and costs may be lowered. In still other embodiments of the present invention, at least some of the catechol-type moieties may be replaced with simple phenolic moieties (e.g., non-catechol monophenols) to achieve an adhesive composition having like adhesive properties.

In various embodiments of the present invention, the adhesive compositions described herein may be introduced into a subterranean formation in order to treat the subterranean formation. When used to treat a subterranean formation, the adhesive compositions may be introduced into the subterranean formation in a treatment fluid. As used herein, the term "treatment fluid" refers to a fluid that is placed in a subterranean formation in order to perform a desired function. Treatment fluids can be used in a variety of subterranean treatment operations, including, but not limited to, drilling operations, production treatments, stimulation treatments, remedial treatments, fluid diversion operations, fracturing operations, secondary or tertiary enhanced oil recovery (EOR) operations, and the like. As used herein, the terms "treat," "treatment," "treating," and other grammatical equivalents thereof refer to any subterranean operation that uses a fluid in conjunction with performing a desired function and/or achieving a desired purpose. The terms "treat," "treatment," and "treating," as used herein, do not imply any particular action by the fluid or any particular component thereof unless otherwise specified. Treatment fluids can include, for example, drilling fluids, fracturing fluids, acidizing fluids, conformance treatment fluids, damage control fluids, remediation fluids, scale removal and inhibition fluids, chemical floods, and the like. In some embodiments of the present invention, treatment fluids containing the adhesive compositions described herein may be used in a subterranean formation for operations such as, for example, wellbore consolidation, particulate pack consolidation (e.g., proppant pack consolidation or gravel pack consolidation), fines control, and the like. In some embodiments of the present invention, the adhesive compositions may form a coacervate-bound surface in the subterranean formation.

In some embodiments of the present invention, the treatment fluids may comprise an aqueous carrier fluid as their continuous phase. Suitable aqueous carrier fluids may include, for example, fresh water, acidified water, salt water, seawater, brine (e.g., a saturated salt solution), or an aqueous salt solution (e.g., a non-saturated salt solution). The aqueous carrier fluids can be obtained from any suitable source. In other embodiments of the present invention, the treatment fluids may comprise an organic solvent, such as hydrocarbons, as their continuous phase.

In some embodiments of the present invention, adhesive compositions described herein may comprise: a first polymer comprising a plurality of monomers that comprise a phenolic moiety; a second polymer that is crosslinkable with the first polymer; a crosslinking agent; and an oxidizing agent. In some embodiments, at least some of the phenolic moieties may comprise a 1,2-dihydroxybenzene moiety. In some embodiments, the second polymer may comprise a biopolymer.

In some embodiments of the present invention, adhesive compositions described herein may comprise: a first polymer comprising a plurality of monomers that comprise a phenolic moiety; a biopolymer that is crosslinkable with the first polymer; a crosslinking agent; and an oxidizing agent.

In some embodiments of the present invention, adhesive compositions described herein may comprise: a first polymer comprising a plurality of monomers that comprise a 1,2-dihydroxybenzene moiety; a second polymer that is crosslinkable with the first polymer; an optional crosslinking agent; and an oxidizing agent.

In some embodiments of the present invention, adhesive compositions described herein may comprise: a first polymer comprising a plurality of monomers that comprise a 1,2-dihydroxybenzene moiety; a biopolymer that is crosslinkable with the first polymer; an optional crosslinking agent; and an oxidizing agent.

As used herein, the term "1,2-dihydroxybenzene" is used interchangeably with the term "catechol." As used herein, the terms "1,2-dihydroxybenzene" and "catechol" refer to an aromatic ring that has phenolic hydroxy groups present on adjacent ring carbon atoms. Reference to 1,2-substitution simply refers to the disposition of the phenolic hydroxy groups relative to one another, not to the conventional IUPAC numbering system or any related numbering system of the substituents on the aromatic ring.

Without being bound by any theory or mechanism, it is believed that phenolic polymers comprising a 1,2-dihydroxybenzene moiety (e.g., a catechol-type moiety) may crosslink at a greater rate and to a greater extent than do non-catechol phenolic polymers. Remaining unbound by theory or mechanism, it is believed that the source of this effect is not just the greater quantity of phenolic hydroxyl groups present in catechol-containing phenolic polymers. Rather, it is believed that the ability of catechols to form o-quinones may promote crosslinking, potentially in a manner similar to that shown in Scheme 1 above. It should be recognized, however, that crosslinking need not necessarily take place as depicted in Scheme 1. For example, in some embodiments of the present invention, an optional crosslinking agent may promote internal crosslinking within the first polymer and/or externally between the first polymer and the second polymer. In other embodiments of the present invention, crosslinking may take place directly without the optional crosslinking agent being present. Unless otherwise specified herein, any statement regarding crosslinking should not be construed to imply any particular mechanism of crosslinking or type of crosslink formed. In the embodiments described herein, it is to be recognized that the first polymer comprising phenolic moieties may be internally crosslinked to itself, externally crosslinked with the second polymer, or both. In some embodiments of the present invention, a crosslinking agent may form the crosslinks. In other embodiments of the present invention, crosslinking may be direct, similar to the crosslinking depicted in Scheme 1. That is, in such embodiments, the crosslinking agent may be absent. As described above, crosslinking of the first polymer to the second polymer may be particularly advantageous for tuning the properties of the adhesive compositions described herein.

In some embodiments of the present invention, the first polymer may comprise a homopolymer. That is, in such embodiments, the first polymer may comprise a homopolymer of monomers that comprise a phenolic moiety. In some embodiments of the present invention, the first polymer may comprise a homopolymer of monomers that comprise a 1,2-dihydroxybenzene moiety.

In some embodiments of the present invention, the first polymer may comprise a copolymer of the monomers comprising the phenolic moiety. That is, in such embodiments, the first polymer may comprise at least two different types of monomer units. Such copolymers may be block, random, graft, or any combination thereof, for example. In some embodiments of the present invention, the copolymer comprising the first polymer may comprise a mixture of monomers where some of the monomers comprise a simple phenolic moiety (e.g., a non-catechol moiety) and some of the monomers comprise a 1,2-dihydroxybenzene moiety (e.g., a catechol-type moiety). In some embodiments of the present invention, additional monomers not comprising a phenolic moiety may further be present.

In some embodiments of the present invention, the first polymer may comprise a copolymer of monomers comprising the phenolic moiety and at least one other copolymer unit. In some embodiments of the present invention, the first polymer may comprise a copolymer of monomers comprising a 1,2-dihydroxybenzene moiety and at least one other copolymer unit. In some embodiments of the present invention, the at least one other copolymer unit may lack a phenolic moiety. That is, a copolymer unit lacking a phenolic moiety may be copolymerized with monomers comprising a phenolic moiety and/or monomers comprising a 1,2-dihydroxybenzene moiety. Suitable copolymer units that may be copolymerized with monomers comprising a phenolic moiety and/or monomers comprising a 1,2-dihydroxybenzene moiety may include, for example, styrenic polymer units, vinylic polymer units (e.g., polyalkylene polymer units), polyether polymer units (e.g., polyethylene glycol polymer units), fluoropolymer units, and any combination thereof. In some embodiments, monomers such as, for example, hydroxyproline, dihydroxyproline, 4-hydroxyarginine, O-phosphoserine, any derivative thereof, and any combination thereof may be copolymerized with monomers comprising a phenolic moiety and/or monomers comprising a 1,2-dihydroxybenzene moiety.

In some embodiments of the present invention, the first polymer comprising the phenolic moiety and/or the 1,2-dihydroxybenzene moiety may not comprise a peptidic polymer backbone. That is, in such embodiments, the first polymer may comprise a non-peptidic polymer. As used herein, the term "non-peptidic polymer" refers to a polymer that does not comprise amino acid oligomers within its polymer backbone. As used herein, the term "amino acid oligomer" refers to 5 or more contiguous amino acids joined in series by peptidic bonds. As used herein, the term "peptidic bond" refers to an amide bond formed between the α-amino group of a first amino acid and the carboxylic acid group of a second amino acid. That is, in some embodiments of the present invention, a non-peptidic polymer may entirely lack peptidic bonds or only have 5 or less contiguous amino acids within its polymer backbone. However, it should be noted that a "non-peptidic polymer" may still comprise a polyamide, where at least some of the amide bonds of the polymer backbone are not peptidic bonds. In such embodiments of the present invention, "non-peptidic polymers" may still comprise at least some amino acid monomers within their polymer backbones. In some embodiments of the present invention, suitable non-peptidic polymers for use in the adhesive compositions described herein may comprise polymer backbones such as, for example, polyamides, polyalkylenes (including polystyrenes), polyesters, polyoxyalkylenes, polyurethanes, and the like, including copolymers thereof, where the phenolic moieties are present as the polymer side chains.

In some embodiments of the present invention, the first polymer may comprise a plurality of side chains that comprise a simple phenol (e.g., a non-catechol moiety). In some embodiments of the present invention, the first polymer may comprise a plurality of side chains that comprise a 1,2-dihydroxybenzene moiety (e.g., a catechol-type moiety). In some embodiments of the present invention, the first polymer may comprise a plurality of side chains, where some of the side chains comprise a simple phenol and some of the side chains comprise a 1,2-dihydroxybenzene moiety.

In some embodiments of the present invention, monomers that comprise a phenolic moiety may have the following structure (Structure 1):

Structure 1

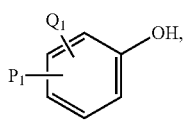

where $P_1$ represents a polymerizable group and $Q_1$ represents any type of functionality on the aromatic ring. Any number of $Q_1$ from 0 to 4 may be present on the aromatic ring in any substitution pattern. Furthermore, $P_1$ may be present in any configuration relative to the hydroxyl group and any $Q_1$ substitution present.

In some embodiments of the present invention, monomers that comprise a 1,2-dihydroxybenzene moiety may have the following structure:

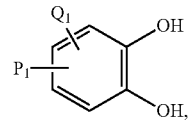

where $P_1$ represents a polymerizable group and $Q_1$ represents any type of functionality on the aromatic ring. Any number of $Q_1$ from 0 to 3 may be present on the aromatic ring in any substitution pattern. Furthermore, $P_1$ may be present in any configuration relative to the hydroxyl groups and any $Q_1$ substitution present. In some embodiments of the present invention, monomers that comprise a 1,2-dihydroxybenzene moiety may comprise polymerizable derivatives of 1,2-dihydroxybenzene compounds or 1,2,3-trihydroxybenzene compounds. Suitable monomers that comprise a 1,2-dihydroxybenzene moiety may include polymerizable derivatives of 1,2-dihydroxybenzene or 1,2,3-trihydroxybenzene compounds such as, for example, catechol, pyrogallol, 1,2,4-benzenetriol, 2,4,5-trihydroxybenzoic acid, 3,4,5-trihydroxybenzoic acid (gallic acid), 2,3,4-trihydroxybenzoic acid, 2,3-dihydroxybenzoic acid, 3,4-dihydroxybenzoic acid, 6,7-dihydroxycoumarin, ellagic acid, urushiols, chlorogenic acid, caffeic acid, and like compounds. It is believed that 1,2,3-trihydroxybenzene compounds may function similarly to 1,2-dihydroxybenzene compounds in the present embodiments in their ability to form an o-quinone. In some embodiments of the present invention, suitable 1,2-dihydroxybenzene compounds may include 3,4-dihydroxyphenylalanine (DOPA), dopamine, any polymerizable derivative thereof, or any combination thereof.

The amount of phenolic moieties or 1,2-dihydroxybenzene moieties to include in the first polymer may vary over a wide range. When only the phenolic moieties or the 1,2-dihydroxybenzene moieties are present (e.g., in a homopolymer), the first polymer may comprise 100% phenolic moieties or 1,2-dihydroxybenzene moieties by weight, expressed as weight percent of the monomer comprising the phenolic moiety or the 1,2-dihydroxybenzene moiety. In copolymer embodiments, an amount of the phenolic moieties or 1,2-dihydroxybenzene moieties may range between about 5% and about 80% by weight of the first polymer, expressed as weight percent of the monomer comprising the phenolic moiety or the 1,2-dihydroxybenzene moiety. In some copolymer embodiments, an amount of the phenolic moieties or 1,2-dihydroxybenzene moieties may range between about 10% and about 40% by weight of the first polymer, expressed as weight percent of the monomer comprising the phenolic moiety or the 1,2-dihydroxybenzene moiety.

As described above, a second polymer may be included in the adhesive compositions described herein, and there may be a number of advantages to be realized in doing so. For example, it may be desirable to utilize quantities of the first polymer that are as small as possible in order to keep production costs low while still achieving a satisfactory degree of adhesion. In some embodiments of the present invention, the second polymer may comprise at least about 50% of the adhesive composition. In some embodiments of the present invention, a ratio of the first polymer to the second polymer can range between about 1:1 to about 1:10. In some embodiments of the present invention, a ratio of the first polymer to the second polymer can range between about 1:1 to about 1:5.

In various embodiments of the present invention, the second polymer may be crosslinkable with the first polymer, where crosslinking may take place in any manner, optionally in the presence of a crosslinking agent. Although the second polymer may be crosslinkable with the first polymer, it is not necessarily required to do so. For example, in some embodiments of the present invention, crosslinking that does take place in the present adhesive compositions may occur internally within the first polymer, with the second polymer remaining unbound to the first polymer. However, in some embodiments of the present invention, the first polymer may be crosslinked to the second polymer, particularly after exposure to a crosslinking agent under conditions suitable to promote crosslinking. In some embodiments of the present invention, both types of crosslinking may be present. It is again to be emphasized that the crosslinking agent may be optional. In particular, when the first polymer comprises a 1,2-dihydroxybenzene moiety and the second polymer comprises an amine, a crosslinking agent may not be necessary to affect crosslinking between the first polymer and the second polymer.

In some embodiments of the present invention, crosslinking of the first polymer may take place after its oxidation. For example, oxidation of a first polymer comprising a 1,2-dihydroxybenzene moiety may promote crosslinking with the second polymer (e.g., through formation of an o-quinone). In other embodiments of the present invention, the first polymer may be crosslinked without oxidation taking place. For example, in some embodiments, when the first polymer comprises a simple phenolic moiety, crosslinking of the first polymer to the second polymer may take place without oxidation of the first polymer occurring. That is, in such embodiments, the unoxidized phenolic moieties may be crosslinked directly through a reaction with a crosslinking agent. In alternative embodiments, a simple phenolic moiety may be crosslinked after oxidation. In embodiments in which the first polymer comprises a plurality of monomers comprising a 1,2-dihydroxybenzene moiety, the 1,2-dihydroxybenzene moieties may be completely oxidized to an o-quinone in some embodiments, or a mixture of unoxidized and oxidized 1,2-dihydroxybenzene moieties may be present in other embodiments.

In some embodiments of the present invention, particularly suitable examples of the second polymer may comprise a plurality of charged moieties. In some embodiments of the present invention, the charged moieties may bear a positive charge. In other embodiments of the present invention, the charged moieties may bear a negative charge. It is believed that use of a charged second polymer may promote the formation of a coacervate when the adhesive compositions are allowed to cure. Without being bound by any theory or mechanism, it is believed that a second polymer comprising a plurality of charged moieties may decrease the energy barrier of a mineral surface being bonded by the coacervate, thereby promoting more effective interaction and stronger bonding therewith. For example, mineral surfaces, including those found in a subterranean formation, may be in a water-wet state with a thin film barrier of water over underlying surface hydroxyl groups. It is believed that a charged second polymer may increase compatibility with this water-wet state.

In some embodiments of the present invention, the second polymer may comprise a biopolymer. In some embodiments of the present invention, the biopolymer may be charged or capable of bearing a charge, depending on pH conditions. Suitable biopolymers may include, for example, chitosan, collagen, keratin, elastin, chitin, cellulose, mucin, any derivative thereof, and any combination thereof. Particularly suitable derivatives may include carboxylic acid- or amine-containing biopolymers or derivatives thereof that can bear a negative charge or a positive charge, respectively. In some embodiments of the present invention, a particularly suitable biopolymer may comprise chitosan or a derivative thereof. In embodiments in which chitosan is used, crosslinking between the chitosan molecules and the first polymer may take place through the amino group of the chitosan molecules.

In some embodiments of the present invention, a crosslinking agent may be used to promote crosslinking of the first polymer. However, in other embodiments of the present invention, crosslinking of the first polymer may occur without the crosslinking agent being present. For example, in some embodiments of the present invention, a first polymer comprising a plurality of monomers comprising a 1,2-dihydroxybenzene moiety may be crosslinked after oxidation without a crosslinking agent being present. In some embodiments of the present invention, suitable crosslinking agents may include transition metal ions. In other embodiments of the present invention, organic crosslinking agents may be used. In some embodiments of the present invention, suitable organic crosslinking agents may include amine-containing compounds, amine-containing oligomers, or amine-containing polymers such as, for example, polyalkyleneimines and polyalkylenepolyamines. In some embodiments of the present invention, a suitable crosslinking agent may comprise polyethyleneimine. In some embodiments of the present invention, a transition metal ion crosslinking agent may play a dual role in crosslinking and oxidizing the first polymer. In some embodiments of the present invention, the transition metal ion may be encountered when the compositions are used in forming a coacervate-bound surface. For example, in some embodiments of the present invention, the adhesive compositions may encounter a transition metal ion or other metal ion that promotes crosslinking when used in conjunction with a subterranean treatment operation. That is, in some embodiments of the present invention, the adhesive compositions may be crosslinked by a metal ion encountered within a subterranean formation.

In some embodiments of the present invention, suitable oxidizing agents may include, for example, a transition metal ion, an oxidizing anion, a peroxide, or any combination thereof. In some embodiments of the present invention, suitable oxidizing anions may include, for example, perborate, percarbonate, chlorate, chlorite, bromate, periodate, or any combination thereof. In some embodiments, the oxidizing agent may comprise a transition metal ion that also serves as a crosslinking agent.

In some embodiments of the present invention, the adhesive compositions described herein may further comprise an additional polymer that is non-crosslinkable with the first polymer. Inclusion of such an additional polymer may be used to further modify the properties of the adhesive compositions. In general, any type of polymer, including biopolymers, may be used as the additional polymer, as long as the additional polymer does not form crosslinks with the first polymer and, optionally, the second polymer.

In some embodiments of the present invention, the adhesive compositions described herein may be used in subterranean treatment operations. Although any subterranean treatment operation lies within the scope of the present embodiments, particularly suitable subterranean operations may include wellbore and near-wellbore consolidation operations, particulate pack consolidation, fracture stabilization, and fines control, for example.

In some embodiments of the present invention, the adhesive compositions described herein may be used in a fracturing operation. For example, the adhesive compositions described herein may be formulated in a fracturing fluid that is used to fracture the subterranean formation. Thereafter, the adhesive compositions may undergo crosslinking so as to form a coacervate-bound surface in the subterranean formation. When used in a fracturing operation, the fracturing fluid may be introduced to the subterranean formation at a pressure sufficient to create or extend at least one fracture in the subterranean formation.

In some embodiments of the present invention, methods described herein may comprise: providing an adhesive composition that comprises a first polymer comprising a plurality of monomers that comprise a phenolic moiety, a biopolymer that is crosslinkable with the first polymer, a crosslinking agent, and an oxidizing agent; introducing the adhesive composition into a subterranean formation; and forming a coacervate-bound surface in the subterranean formation by crosslinking the first polymer.

In some embodiments of the present invention, methods described herein may comprise: providing an adhesive composition that comprises a first polymer comprising a plurality of monomers that comprise a 1,2-dihydroxybenzene moiety, a second polymer that is crosslinkable with the first polymer, an optional crosslinking agent, and an oxidizing agent; introducing the adhesive composition into a subterranean formation; oxidizing at least a portion of the 1,2-dihydroxybenzene moieties so as to crosslink the first polymer; and forming a coacervate-bound surface in the subterranean formation. In some embodiments of the present invention, the second polymer may comprise a biopolymer.

In some embodiments of the present invention, forming a coacervate-bound surface in the subterranean formation may comprise consolidating a wellbore surface or consolidating a plurality of particulates in the subterranean formation. Consolidating a wellbore surface may stabilize the wellbore surface in loosely consolidated formations. In some embodiments of the present invention, consolidating a plurality of particulates may comprise consolidating a proppant pack. In other embodiments of the present invention, consolidating a plurality of particulates may comprise consolidating a gravel pack. Consolidation of a particulate pack may reduce the amount of particulates produced from the subterranean formation. In still other embodiments of the present invention, consolidating a plurality of particulates may comprise controlling fines in the subterranean formation. In some embodiments, formation of a coacervate-bound surface in the subterranean formation may occur subsequent to a fracturing operation.

In some embodiments of the present invention, the first polymer may be crosslinked to the second polymer or to the biopolymer. In some embodiments of the present invention, the first polymer may be internally crosslinked with itself. In still other embodiments of the present invention, the first polymer may be both internally crosslinked and crosslinked to the second polymer or to the biopolymer.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. An adhesive composition consisting of:
    a first polymer comprising a plurality of monomers that comprise a 1,2-dihydroxybenzene moiety, the first polymer having a polymer backbone comprising 5 or fewer continuous amino acids joined in sequence by peptidic bonds;
        wherein the polymer backbone contains the 1,2-dihydroxybenzene moiety as a polymer side chain and is selected from the group consisting of a polyamide, a polyalkylene, a polystyrene, a polyurethane, and a copolymer thereof;
    a second polymer that is crosslinkable with the first polymer;
        wherein a ratio of the first polymer to the second polymer in the adhesive composition ranges between about 1:1 to about 1:10;
    a crosslinking agent; and
    an oxidizing agent comprising an oxidizing anion selected from the group consisting of perborate, percarbonate, chlorate, chlorite, bromate, and any combination thereof.

2. The adhesive composition of claim 1, wherein the first polymer is internally crosslinked, crosslinked with the second polymer, or both.

3. The adhesive composition of claim 1, wherein the crosslinking agent comprises a transition metal ion.

4. The adhesive composition of claim 1, wherein the second polymer comprises a biopolymer selected from the group consisting of chitosan, collagen, keratin, elastin, chitin, cellulose, mucin, any derivative thereof, and any combination thereof.

5. The adhesive composition of claim 1, wherein the first polymer comprises a copolymer of the monomers comprising the 1,2-dihydroxybenzene moiety and at least one other copolymer unit.

6. The adhesive composition of claim 5, wherein the at least one other copolymer unit comprises a styrenic polymer unit, a vinylic polymer unit, a fluoropolymer unit, or a polymer unit comprising a monomer selected from the group consisting of hydroxyproline, dihydroxyproline, 4-hydroxyarginine, O-phosphoserine, any derivative thereof, and any combination thereof.

7. An adhesive composition consisting of:
a first polymer comprising a plurality of monomers that comprise a 1,2-dihydroxybenzene moiety, the first polymer having a polymer backbone comprising 5 or fewer continuous amino acids joined in sequence by peptidic bonds;
    wherein the polymer backbone contains the 1,2-dihydroxybenzene moiety as a polymer side chain and is selected from the group consisting of a polyamide, a polyalkylene, a polystyrene, a polyurethane, and a copolymer thereof;
a second polymer that is crosslinkable with the first polymer;
a crosslinking agent;
a non-crosslinkable polymer; and
an oxidizing agent comprising an oxidizing anion selected from the group consisting of perborate, percarbonate, chlorate, chlorite, bromate, and any combination thereof.

8. The adhesive composition of claim 7, wherein the first polymer is internally crosslinked, crosslinked with the second polymer, or both.

9. The adhesive composition of claim 7, wherein the crosslinking agent comprises a transition metal ion.

10. The adhesive composition of claim 7, wherein the second polymer comprises a biopolymer selected from the group consisting of chitosan, collagen, keratin, elastin, chitin, cellulose, mucin, any derivative thereof, and any combination thereof.

11. The adhesive composition of claim 7, wherein the first polymer comprises a copolymer of the monomers comprising the 1,2-dihydroxybenzene moiety and at least one other copolymer unit.

12. The adhesive composition of claim 11, wherein the at least one other copolymer unit comprises a styrenic polymer unit, a vinylic polymer unit, a fluoropolymer unit, or a polymer unit comprising a monomer selected from the group consisting of hydroxyproline, dihydroxyproline, 4-hydroxyarginine, O-phosphoserine, any derivative thereof, and any combination thereof.

13. An adhesive composition consisting of:
a first polymer comprising a plurality of monomers that comprise a 1,2-dihydroxybenzene moiety, the first polymer having a polymer backbone comprising 5 or fewer continuous amino acids joined in sequence by peptidic bonds;
    wherein the polymer backbone contains the 1,2-dihydroxybenzene moiety as a polymer side chain and is selected from the group consisting of a polyamide, a polyalkylene, a polystyrene, a polyurethane, and a copolymer thereof;
a second polymer that is crosslinkable with the first polymer;
    wherein a ratio of the first polymer to the second polymer in the adhesive composition ranges between about 1:1 to about 1:10; and
an oxidizing agent comprising an oxidizing anion selected from the group consisting of perborate, percarbonate, chlorate, chlorite, bromate, and any combination thereof.

* * * * *